United States Patent [19]

Matsumoto

[11] 4,239,329

[45] Dec. 16, 1980

[54] OPTICAL NONRECIPROCAL DEVICE

[75] Inventor: Takao Matsumoto, Yokosuka, Japan

[73] Assignee: Nippon Telegraph and Telephone Public Corporation, Tokyo, Japan

[21] Appl. No.: 60,881

[22] Filed: Jul. 26, 1979

[30] Foreign Application Priority Data

Aug. 4, 1978 [JP] Japan .................................. 53-95221
Nov. 17, 1978 [JP] Japan ................................ 53-141862
Dec. 26, 1978 [JP] Japan ................................ 53-162976
Feb. 26, 1979 [JP] Japan .................................. 54-21678

[51] Int. Cl.³ .......................... G02B 5/14; G02F 1/09
[52] U.S. Cl. ............................ 350/96.15; 350/96.13; 350/96.18; 350/151
[58] Field of Search ............... 350/96.15, 96.18, 96.13, 350/151

[56] References Cited

U.S. PATENT DOCUMENTS

| | | | |
|---|---|---|---|
| 3,830,555 | 8/1974 | Warner .......................... | 350/96.13 |
| 3,860,325 | 1/1975 | Matsushita et al. .............. | 350/96.13 |
| 4,153,328 | 5/1979 | Wang ............................ | 350/96.13 |
| 4,178,073 | 12/1979 | Uchida et al. ................... | 350/151 |

OTHER PUBLICATIONS

Swindell, "Extraordinary-ray and -wave tracing in uniaxial crystals" in *Applied Optics*, Vol. 14, No. 9 Sep. 1975 pp. 2298–2301.

*Primary Examiner*—Stewart J. Levy
*Attorney, Agent, or Firm*—Frishauf, Holtz, Goodman & Woodward

[57] ABSTRACT

The optical nonreciprocal device is used to optically couple together two opposed optical fibers. The light from one optical fiber is separated into ordinary ray and extraordinary ray by a first birefringent crystal member. The separated ordinary and extraordinary rays are subject to a total of 90° polarization rotation by transmitting in a forward direction through a magneto-optical member having an angle of polarization rotation of 45° and through a compensating plate. The separated ordinary and extraordinary rays are synthesized by transmitting through a second birefringent crystal member and then applied to the other optical fiber. A lens is interposed between one optical fiber and the first birefringent crystal member for causing the light to propagate through the light path while being converged or diverged. By suitably selecting the thicknesses of the first and second birefringent crystal members, the ordinary and extraordinary rays propagating from the second optical fiber to the first optical fiber in the reverse direction are prevented from being overlapped at the incident end of the first optical fiber thus providing an optical isolator.

7 Claims, 14 Drawing Figures

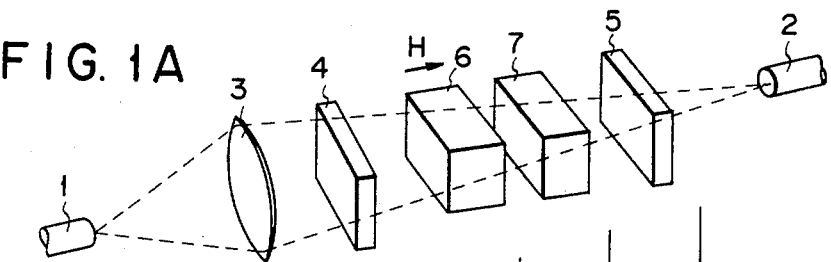
FIG. 1A
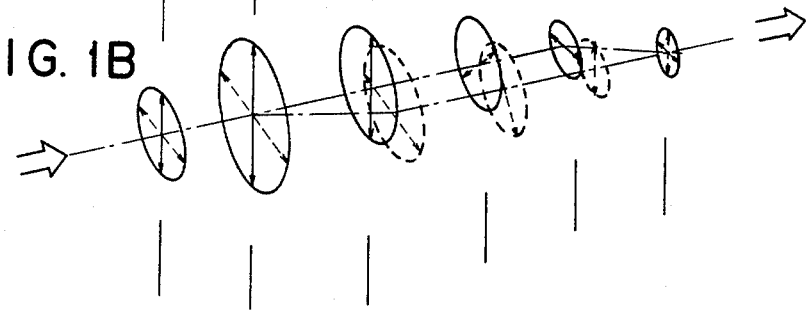
FIG. 1B
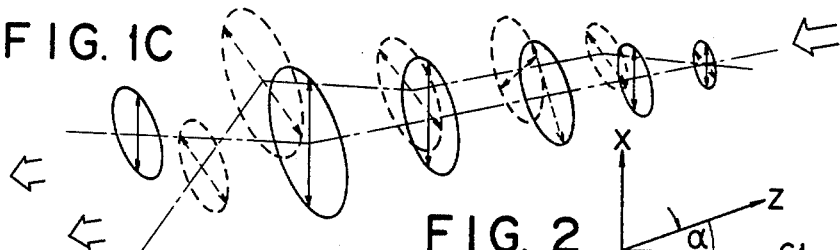
FIG. 1C
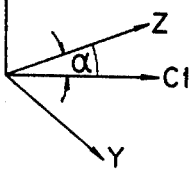
FIG. 2
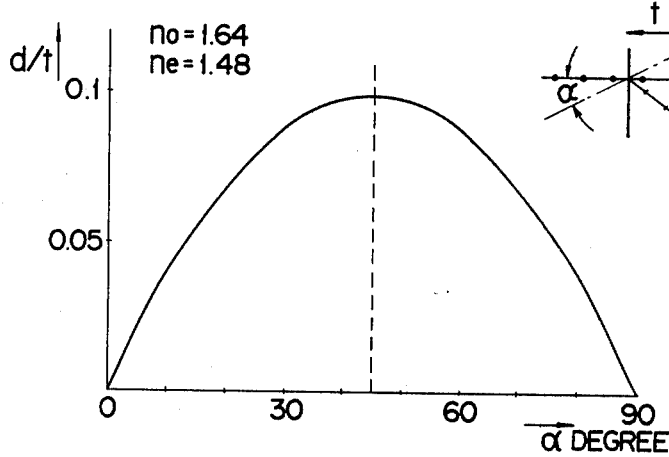
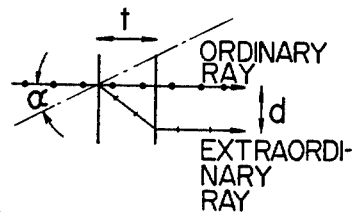
FIG. 3

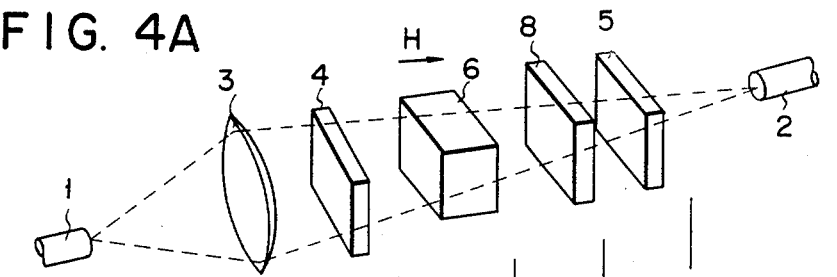
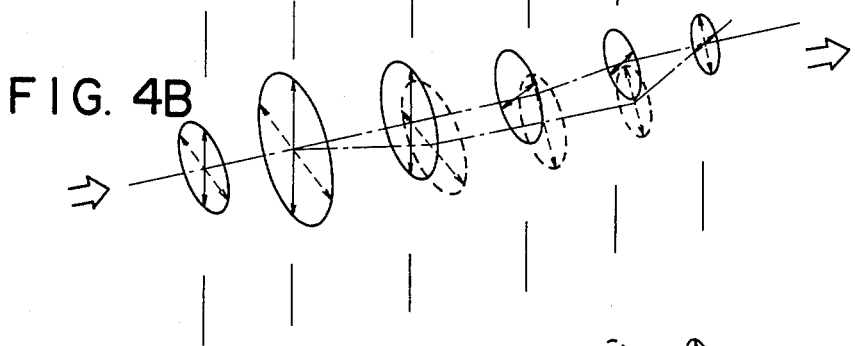
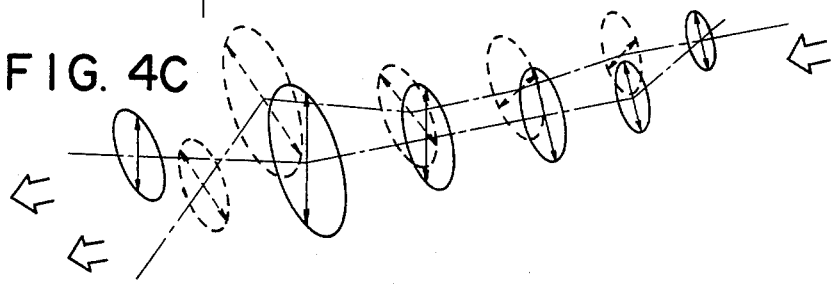
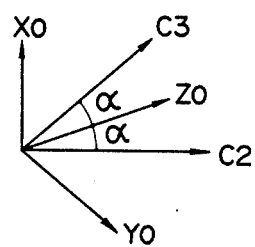
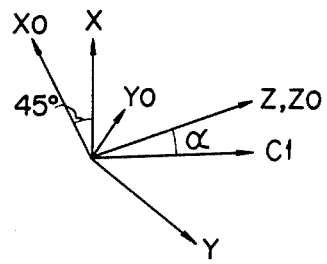

OPTICAL NONRECIPROCAL DEVICE

This invention relates to improvement of an optical nonreciprocal device having light isolation performance and adapted to be coupled with optical fibers.

To advance the use of optical fiber communications, it is necessary to develop as many kinds of optical devices as possible for practical applications. Optical nonreciprocal devices such as optical isolators and optical circulators are included in the devices to be developed. These optical devices are used to prevent reflection of light back to a light source for stabilizing the operation thereof or to isolate light according to the propagation direction so as to provide high degree of transmission systems. However, the optical nonreciprocal devices have polarization dependent characteristics, and therefore their insertion losses change from zero to infinite according to the polarization condition.

Generally stated, except special conditions, when light propagates through optical fibers the polarization condition is not constant but contains many polarized light components. Linearly polarized light at the excitation end of the optical fiber would loss linearlity of the polarized light when it propagates over a small distance. As the optical transmission system becomes sophisticated, it became necesary to interpose optical devices between optical fibers. Prior art optical isolator or optical circulator can be inserted only at such points where the linearlity of the polarized light is maintained in the optical fibers. For this reason, in an optical nonreciprocal device adapted to be coupled with optical fibers it has been desired to eliminate polarization dependency, or to construct the device to be operatable for any and all polarized lights for the purpose of decreasing the optical power loss and for making it easy to use.

Moreover, in the prior art optical isolator or an optical circulator utilizing the prior art polarization prism, as the characteristic of the polarization prism is greatly influenced by the angle of an internal junction surface, considerably high accuracies have been required to manufacture excellent polarization prism. Accordingly, it has been difficult to provide a polarization prism having a predetermined configuration.

In a known optical isolator construction, a plurality of crystal plates, that is an anisotropic crystal plate and a magneto-optical plate, containing a birefringence crystal plate capable of separating light transmitting between two opposing fibers into ordinary ray and extraordinary ray, are sequentially arranged in the optical path and such optical system as a lens or the like is combined with the crystal plates for propagating light from one optical fiber through the optical path as parallel beams. Thereafter, the ordinary ray and the extraordinary ray are synthesized again to be transmitted to the other optical fiber. One example of such optical isolator is disclosed in Japanese laid open patent specification No. 149046/1978 (inventor: Teiji UCHIDA).

With this construction, however, as the light propagates in the form of parallel beams, in order to effect efficient isolation, it is necessary to make the isolation distance between the ordinary ray and the extraordinary ray being separated to be longer than at least the diameter of a lens utilized. Accordingly, in view of the general shape of the optical fiber and the lens, the thickness and the cross-sectional area of respective crystal plates become considerably large which is opposite to the request of miniaturizing the optical isolator and decreasing the optical power loss. Moreover, as it is necessary to use expensive optical crystals, increase in the size results in the increase in the price.

Accordingly, it is an object of this invention to provide an improved optical nonreciprocal device having improved light isolation performance and can minuaturize the device and decrease optical power loss.

According to this invention there is provided an optical nonreciprocal device adapted to optically couple together two opposed optical fibers, the device comprising light focusing and transmitting means located in an optical path between the two optical fibers on a side of either one of the optical fibers for converging and diverging light propagating through the optical path; a plurality of anisotropic crystal numbers interposed between the light focusing and transmitting means and the other optical fiber, the thicknesses of the anisotropic crystal members being set to specific values such that the light is separated into ordinary ray and extraordinary ray and then the ordinary and extraordinary ray are synthesized again to be transmitted to the other optical fiber which the ordinary ray and the extraordinary ray propagate in a forward direction, and that the ordinary ray and the extraordinary ray propagating from the other optical fiber in a reverse direction would not superpose each other at an excitation end of the one optical fiber, and magneto-optical member having a predetermined polarization rotating angle and interposed between any two of the plurality of anisotropic crystal members for imparting a predetermined polarization rotation to the isolated ordinary and extraordinary rays while they propagate through the optical path.

With this construction the light from one optical fiber propagates through the optical path while diverging and converging by passing the light through the lens. For this reason, the spacing between the separated ordinary and extraordinary rays is smaller than the prior art construction wherein the light is propagated in the form of parallel beams thus minuaturing the construction and decreasing optical loss. The spacing may be equal to the core diameter of the optical fiber thus enabling to decrease the size by about one order of magnitude than the case of parallel beam where the spacing is equal to the lens diameter. The thickness of the birefringent crystal members and the sectional areas of all crystals can be reduced in proportion to the reduction in the spacing. When the thicknesses of the birefringent crystal members are selected to proper values the ordinary and extraordinary rays propagating in the reverse direction between the optical fibers are prevented from overlapping at the facet of the fiber thus providing an optical isolator.

This invention can be more fully understood from the following detailed description when taken in conjunction with the accompanying drawings, in which:

FIG. 1A shows an arrangement of various elements which constitute one embodiment of an optical nonreciprocal device according to this invention;

FIG. 1B is a diagrammatic representation showing a manner of light components transmitting through various elements shown in FIG. 1A in the forward direction;

FIG. 1C is a diagrammatic representation showing a manner of light components transmitting through various elements shown in FIG. 1A in the reverse direction;

FIG. 2 is a vector diagram showing the optic axis of the birefringent crystal member and the direction of light propagation shown in FIG. 1A;

FIG. 3 shows the relationship among the thickness t of a birefringent plate made of calcite, the isolation spacing d of exit lights and the angle α at which the optic axis of the birefringent plate is inclined to the optical path which is perpendicular to the surface of the plate;

FIG. 4A shows an arrangement of various elements which constitute another embodiment of the optical nonreciprocal device according to this invention;

FIG. 4B is a diagrammatic representation showing a manner of light components transmitting through various elements shown in FIG. 4A in the forward direction;

FIG. 4C is a diagrammatic representating showing a manner of light components transmitting through various elements shown in FIG. 4A in the reverse direction;

FIG. 5 is a vector diagram showing the optic axes of the two adjacent birefringent crystal members and the directions of light propagation shown in FIG. 4A;

FIG. 6 is a vector diagram showing the relationship between rectangular coordinates used for representing the optic axes of the two adjacent birefringent crystal members in FIG. 5 and the optic axes of another birefringent crystal member.

Figure 7A:
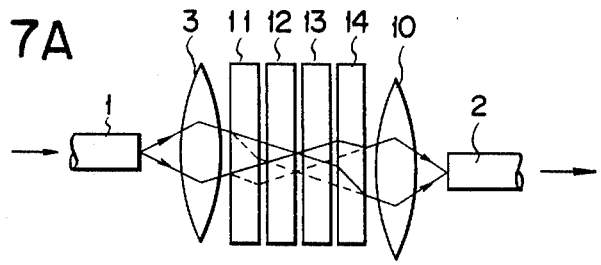
FIGS. 7A, 7B, 8 and 9 are diagrammatic representations respectively showing still another embodiments of this invention.

A preferred embodiment of this invention will now be described with reference to the accompanying drawings. As shown in FIG. 1A, a lens 3 and two birefringent crystal plates 4 and 5 are disposed in an optical path extending between two opposed optical fibers 1 and 2. Between the birefringent crystal plates 4 and 5 are disposed an magneto-optical member 6 having a Faraday rotation angle of 45° and made of YIG, for example, and a compensating plate 7 having a thickness determined such that it will have a polarization rotation angle of 45°. The birefringent crystal plates 4 and 5 are made of calcite, for example, and functions to separate the light transmitting therethrough into ordinary ray and extraordinary ray.

As well known, the separation of the ordinary and extraordinary rays depends on angle α defined by, as shown in the vector diagram of FIG. 2, Z axis, i.e. direction of propagation of light and an optical axis $C_1$ inherent to the birefringent crystal plate. Some methods have already been proposed in order to figure out the degree of separation of ordinary and extraordinary rays. Such a method is disclosed in "Extraordinary-ray and -wave Tracing in Uniaxial Crystals" (APPLIED OPTICS, Vol. 14, No. 9, September 1975).

Suppose light is incident upon the birefringent crystal plate of this invention perpendicularly and that the optic axis of the birefringent crystal plate inclines by an angle α to the light propagation direction. Then, the relationship among the separation spacing d of the exit lights, the thickness t of the birefringent plate and the above-mentioned angle α is expressed as follows, using the calculation technique disclosed in the above-noted article:

$$\frac{d}{t} = \frac{\sin\alpha \cos\alpha (n_o^2 - n_e^2)}{n_o^2 \sin^2\alpha + n_e^2 \cos^2\alpha},$$

where $n_o$ and $n_e$ represent principal refractive indeces corresponding to the ordinary ray and the extraordinary ray, respectively. When the birefringent crystal plate is made of calcite, d/t is obtained as illustrated in FIG. 3. Where the two birefringent crystal plates 4 and 5 are made to have the same thickness and the same optic axis orientations the light transmitting therethrough would be separated into the ordinary ray and the extraordinary ray with the same separation spacing d given by the equation described above. The compensation plate 7 may be constituted by a polarization rotator made of a half wave plate of crystal having an optic axis in a given orientation. When combined with the magnetized magneto-optical member 6, the compensation plate 7 functions to rotate, the polarization of light propagating in the forward direction, by 90°, for example, whereas not to change the polarization of light propagating in the reverse direction.

When light exits from optical fiber 1 toward optical fiber 2, the light spot will be magnified when transmitting through the lens 3 and then enters into the optical fiber 2 while being converged, as shown in FIG. 1B. More particularly, the light transmitting through the lens 3 would be separated into the ordinary and the extraordinary rays with a predetermined spacing therebetween by the birefringent crystal plate 4 having a predetermined thickness.

When transmitting through the magneto-optical member 6, the polarization of the ordinary and extraordinary rays thus separated are rotated by 45° in the clockwise direction. Furthermore, the polarization of these lights would be again rotated by 45° when they transmit through the compensation plate 7, thereby providing a total of 90° of polarization rotation. When transmitting through the birefringent crystal plate 5, the separated ordinary and extraordinary rays are synthesized again so as to be incident upon the optical fiber 2 after being subjected to 90° of polarization rotation from the state before separation with the birefringent crystal plate 4.

Conversely, as shown in FIG. 1C the light emitting from the optical fiber 2 is separated into the ordinary ray and the extraordinary ray when it transmits through the birefringent crystal plate 5. Then, the polarizations of the ordinary and extraordinary rays would be rotated by 45° when they transmit through the compensation plate 7. However, different from the forward transmission, when the lights transmit through the magneto-optical member 6 in the reverse direction their polarizations would be rotated by 45° in the counterclockwise direction, with the result that the ordinary and extraordinary rays transmitting through the birefringent crystal plate 4 would travel toward the optical fiber 1 while in the separated state. Where the thicknesses of the birefringent crystal plates 4 and 5 are preset such that two light spots of the ordinary and extraordinary rays do not overlap each other at the excitation end of the optical fiber 1, these lights would be prevented from entering into the optical fiber 1, thus constituting an optical isolator. To this end, the values of α and t should be selected such that the value of d given by the foregoing equation would be larger than the core diameter of the optical fiber.

Another embodiment of this invention will now be described. The construction shown in FIG. 4A is identical to that shown in FIG. 1A except that the compensation plate 7 shown in FIG. 1A is replaced by another birefringent crystal plate 8.

As shown by the vector diagram shown in FIG. 5, the optic axes of the birefringent crystal plates 8 and 5 coincide respectively with optic axes $C_2$ and $C_3$ each having an angle $\alpha$ with respect to axis $Z_o$ along which the light propagates. Further, it is designed that a $Z_o$-$Y_o$ plane containing the optic axis $C_2$ would intersect at right angles an $X_o$-$Z_o$ plane containing the optic axis $C_3$. As the vector diagram shown in FIG. 6, these two planes intersecting each other at right angles, incline by 45° with respect to a Z-Y plane containing the optic axis $C_1$ of the birefringent crystal plate 4 and to an X-Z plane intersecting the Z-Y plane at right angles.

With this construction, as shown in FIG. 4B, the light emitting from the optical fiber 1 is separated into ordinary ray and extraordinary ray by the birefringent crystal plate 4 and their polarization would be rotated 45° by the magneto-optical member 6, but, their polarization would not be varied even when they transmit through the birefringent crystal plates 5 and 8. However, since the two separated lights are deflected by either one of the birefringent crystal plates 5 and 8, respectively, so that these lights are finally synthesized at the exit end. Accordingly, all lights enter into the optical fiber 2 without any loss.

Conversely, as shown in FIG. 4C, the light emitting from the optical fiber 2 would be isolated into the ordinary and extraordinary rays by the birefringent crystal plates 5 and 8, but these lights travel toward the optical fiber 1 while being maintained in the separated state even when they transmit through the magneto-optical member 6 and the birefringent crystal plate 4. Thus, it is possible to prevent light supplied by the optical fiber 2 from entering into the optical fiber 1. As above described, this modification too can operate as an optical isolator just in the same manner as the first embodiment.

In the embodiment shown in FIG. 4A where the optical axes of three birefringent crystal plates 4, 8, and 5 incline by the same angle $\alpha$ with respect to the direction of propagation of light, by selecting the thicknesses of the birefringent crystal plates 8 and 5 to be equal to $1/\sqrt{2}$ of the birefringent crystal plate 4 it becomes possible to provide the same function as the embodiment shown in FIG. 1A although the light path is not the same.

While in the foregoing example, it was described that the magneto-optical member is made of YIG and that this member has a Faraday rotation angle of 45°, where another magneto-optical material having smaller Faraday rotation angle is used it is possible to provide a large polarization rotation angle by mounting total reflection mirrors on the front and rear sides of the magneto-optical member so as to cause multiple-reflections of light inside the member.

Figure 7B:
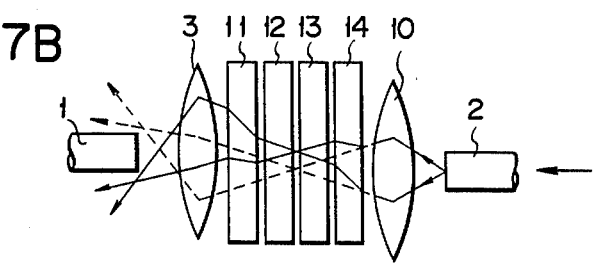

While in each of the foregoing embodiments a single lens 3 was interposed between the optical fiber 1 and the birefringent crystal plate 4 for effecting divergence and convergence of light, where two lenses are used, it is advantageous to dispose lens 3 on the side facing the optical fiber 1, to dispose a lens 10 on the side facing the optical fiber 2 and to interpose three anisotropic crystals 11, 13 and 14 together with the magneto-optical member 12 between lenses 3 and 10, as shown in FIGS. 7A and 7B.

In the case shown in FIG. 7A, so long as the optic axes of the three anisotropic crystals 11, 13 and 14 were selected suitably, the light emitting from the optical fiber 1 and transmitting through lens 3 in the forward direction, would be converged to focus a real image of the facet of the optical fiber 1 while the light transmits through a path including the anisotropic crystals 11, 13 and 14 and the magneto-optical member 12 and then caused to enter the optical fiber 2 by the lens 10.

Conversely, as shown in FIG. 7B light emitting from the optical fiber 2 would be focussed while it transmits through the anisotropic crystals 11, 13 and 14 and the magneto-optical member 12 through lens 10 just in the same manner as in a case in which the light propagates in the forward direction. Then, while passing through lens 3, the light is separated into ordinary ray and extraordinary ray, so that these lights would not be caused to enter into the optical fiber 1, thus providing an optical isolator.

With this construction, the spacing between the ordinary and extraordinary rays thus separated may be equal to the core diameter of the optical fiber in the same manner as a case utilizing only one lens. If it is designed to render the light to become parallel light beams the spacing would become a large value comparable with the diameter of the lens.

Figure 8:
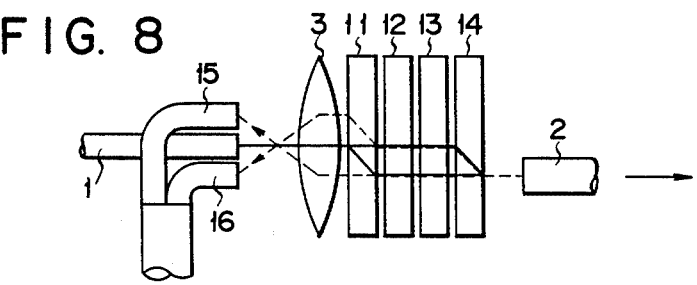
Figure 9:
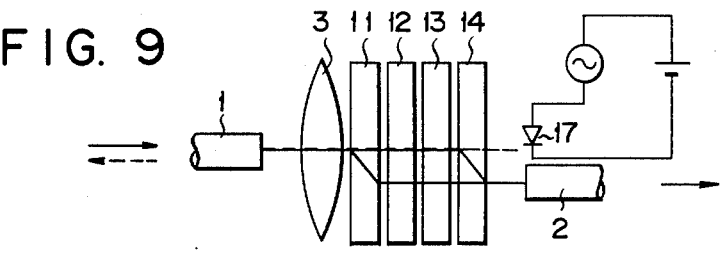

FIGS. 8 and 9 illustrate still further modifications of this invention which show optical nonreciprocal devices acting as an optical circulator, and in which elements corresponding to those shown in FIG. 7A are designated by the same reference numerals for the sake of simplicity.

In the embodiment shown in FIG. 8, the light emitting from the optical fiber 2 and transmitting through lens 3 in the reverse direction would be separated into ordinary and extraordinary rays and then collected and synthesized by two additional optical fibers 15 and 16 whereby the light is led in a direction different from the direction of propagation of the light transmitting through the optical fiber 1. Although not shown in the drawing, the light incident upon two additional fibers can be synthesized by another lens and then applied to such photoelectric converting element as a photodiode for generating an electrical signal.

In the embodiment shown in FIG. 9 the light propagating in the forward direction from optical fiber 1 would transmit through the anisotropic crystals 11, 13 and 14 and the magneto-optical member 12 then applied to the optical fiber 2. On the other hand, the light propagating in the reverse direction is emitted from a luminous members having a high degree of polarization, for example, a semiconductor laser 17. The light emitted by the semiconductor laser 17 is incident upon the fiber 1 without any loss. The luminous member may be such one that emits light having a high degree of polarization of one end of an optical fiber having the other end connected with a source of light.

While in all embodiments described above description has been made on the assumption that various element are spacially separated from each other, where they are bonded together with a suitable binder it is possible to greatly miniaturize the structure.

What we claim is:

1. An optical nonreciprocal device adapted to optically couple together two opposed optical fibers, said device comprising:
light focusing and transmitting means located in an optical path between said two optical fibers on a side of either one of said optical fibers for converging and diverging light propagating through said optical path;
a plurality of anisotropic crystal members interposed between said light focusing and transmitting means and the other optical fiber, while the thicknesses of said anisotropic crystal members being set to predetermined values such that the light is separated into ordinary ray and extraordinary ray and then said ordinary ray and said extraordinary ray are synthesized again to be transmitted to the other optical fiber while said ordinary ray and said extraordinary ray propagate in a forward direction, and that said ordinary ray and said extraordinary ray propagating from said other optical fiber in a reverse direction would not superpose each other at an excitation end of said one optical fiber; and magneto-optical members having a predetermined polarization rotating angle and interposed between any two of said plurality of anisotropic crystal members for imparting a predetermined polarization rotation to said separated ordinary and extraordinary rays while they propagate through said optical path.

2. The optical nonreciprocal device according to claim 1 wherein said plurality of anisotropic crystal members comprise a first birefringent crystal member located adjacent said light focusing and transmitting means for separating light propagating in said forward direction into ordinary ray and extraordinary ray, a compensating plate of crystal for further rotating said ordinary ray and said extraordinary ray which have been rotated when transmitting through said magneto-optical member, and a second birefringent crystal member for synthesizing said separated ordinary ray and said extraordinary ray transmitting through said compensating plate.

3. The optical nonreciprocal device according to claim 1 wherein said plurality of anisotropic members comprise a first birefringent crystal member located adjacent said light focusing and transmitting means for separating light propagating in said forward direction into ordinary ray and extraordinary ray, a second birefringent crystal member for deflecting the direction of propagation of said ordinary and extraordinary rays rotated while transmitting through said magneto-optical member, and a third birefringent crystal member having a different optic axis contained in a plane which intersects at right angles with a plane defined by an optic axis of said second birefringent crystal member and an axis extending in the direction of propagation of said light thereby synthesizing said separated ordinary and extraordinary rays.

4. The optical nonreciprocal device according to claim 1 wherein said light focusing and transmitting means comprise a pair of lenses arranged such that said plurality of anisotropic crystal members and said magneto-optical member are included in said light path, that the excitation ends of said two optical fibers are located respectively of the outsides of focal positions and that real images of said excitation ends of said optical fibers would be focused in said optical path.

5. The optical nonreciprocal device according to claim 1 which further comprises two additional optical fibers disposed to independently collect said isolated ordinary and extraordinary ray propagating in said reverse direction and to lead said collected lights in a direction different from the direction of incident to said optical fiber.

6. The optical nonreciprocal device according to claim 1 which further comprises a luminous member disposed near an optical fiber which receives light propagating in said forward direction for emitting light propagating in said reverse direction.

7. The optical nonreciprocal device according to claim 6 wherein said luminous member comprises a semiconductor laser.

* * * * *